UNITED STATES PATENT OFFICE.

EDWARD J. HOFFMAN, OF CHICAGO, ILLINOIS, ASSIGNOR OF ONE-HALF TO CHARLES W. ADAMS, OF CHICAGO, ILLINOIS.

PROCESS OF MANUFACTURING ARTIFICIAL FUEL.

SPECIFICATION forming part of Letters Patent No. 707,231, dated August 19, 1902.

Application filed November 29, 1901. Serial No. 84,110. (No specimens.)

*To all whom it may concern:*

Be it known that I, EDWARD J. HOFFMAN, of Chicago, in the county of Cook and State of Illinois, have invented a new, useful, and Improved Process of Manufacturing Artificial Fuel, of which the following is a full, clear, and exact description.

Attempts have heretofore been made to manufacture an artificial fuel by combining hydrocarbon or other oils with an absorbent material—such as sawdust, coal-dust, peat, and various forms of waste or earthy matter— either by mechanically mixing the absorbent material with the oil in such a way as to form a loose and comparatively dry product or by mixing the two with a suitable binder—such, for example, as rosin—and then compressing the product into molds. Such mixtures are, however, unsatisfactory and objectionable as fuel, for the reason that oil mixed with earth or similar absorbent cannot be burned without leaving the material by which it is absorbed, which exercises practically no restraining influence upon combustion, and hence the oil is burned with a dense black smoke, leaving the absorbent as a comparatively dead and useless mass. Moreover, in storing such fuel the tendency is for the oil to separate and settle to the bottom, thus rendering the mixture objectionable and dangerous.

The object of my invention is to overcome these difficulties and objections in the utilization of hydrocarbon oil and earthy or organic matters by so treating the oil before or at the time of combining it with the absorbent material that the oil will not only become solidified, but will remain with the absorbent as a permanent and durable compound, so that it may be stored without change or risk and when ignited will burn steadily and uniformly without causing the oil to separate from the absorbent.

A further object is to provide a fuel mixture composed, essentially, of hydrocarbon oil and an absorbent material that may be compressed into molds with sufficient force to form a hard, compact, and smooth product without squeezing the oil from the absorbent or lessening the value of the whole as a fuel.

To these ends my invention consists in the improved process by which said results are obtained, as well as in the product resulting therefrom, as hereinafter specifically set forth and particularly claimed.

The following is a description of my improved process. To a given quantity of crude petroleum I add a sufficient percentage of alkaline salt, preferably in the form of caustic soda, to chemically combine with and cause concretion or coagulation of all the oil. In other words, the proportion should be such, varying, of course, with the character of the oil and the strength of the alkaline reagent used, to cause a complete chemical reaction, leaving no "free" oil. For most hydrocarbon oils I would recommend about one part, by weight, of the alkaline salt to about eight parts, by weight, of oil. The two should then be heated to such a degree and for such a time as to cause thorough concretion. This usually requires about half an hour and a temperature of from about 180° to about 212° Fahrenheit. While being heated the ingredients should be stirred or agitated to facilitate chemical action. As the chemical action advances the parts coalesce and the mixture becomes thick and viscid. The process should be continued until complete concretion results. If at this stage the mass be allowed to cool, it will "set" or solidify, its density increasing within certain limits in proportion to the length of time it is permitted to stand; but instead of permitting it to so cool and harden I add thereto before the mixture begins to thicken or at the outset as much dry earth or loam as will be received thereby. The earth, which is preferably free from sand or clay, such as vegetable loam, should be thoroughly dry and no more should be used than will be completely permeated with the oily product. I have found in practice that some soils will absorb more oil than others and more of certain kinds of oil than of others, so that in carrying out my process considerable discretion should be used. For example, I have found that Illinois loam will absorb about thirty gallons of Ohio oil to the ton of earth and about forty-seven gallons of Beaumont oil. The proportions which I would ordinarily recommend are about as follows: petroleum, eight parts; caustic soda, one part; dry earth, two hundred and fifty parts. This formula applies more particularly to Pennsylvania oil. After the earth is thoroughly mixed with the chemically-combined oil and alkali it may be used for fuel, either in a loose form or compressed in the form of briquets, the latter being preferred; but in either case I prefer to let it stand for a considerable time before use, as it becomes harder when so cured. My improved fuel burns uniformly without smoke and with little ash, while the heat units thereof exceed those of the best grades of coal. Careful tests have demonstrated that a pound of the fuel will evaporate fourteen pounds of water. The fuel is cleanly, may be stored or transported like any other solid fuel, gives off no dust or free oil, and is highly economical.

Having thus described my invention, I claim—

1. The process, substantially as described, of manufacturing artificial fuel, consisting in combining hydrocarbon oil with caustic soda and non-silicious, non-kaoliferous earth in about the proportions specified, agitating the mixture and subjecting the same to moderate heat until a complete chemical combination is effected between the oil and alkali, and a complete admixture is effected with said earthy absorbent.

2. The process, substantially as described, of manufacturing artificial fuel, consisting in mixing hydrocarbon oil with a sufficient proportion of alkaline salt to produce complete concretion of all the oil and a sufficient quantity of non-silicious, non-kaoliferous earth to fully absorb the oleaginous mixture, heating and agitating the ingredients until complete concretion and admixture results, and finally compressing the same in molds.

3. The process, substantially as described, of manufacturing artificial fuel, consisting in mixing hydrocarbon oil, caustic soda and an earthy absorbent, in the proportion by weight of about eight parts of oil, one part of soda, and two hundred and fifty parts of non-silicious, non-kaoliferous earth, and heating and agitating the ingredients until a complete chemical reaction is effected between the oil and soda, and a thorough admixture is made with the earthy absorbent.

4. The process, substantially as described, of manufacturing artificial fuel, consisting in mixing hydrocarbon oil, caustic soda and vegetable loam in the proportion by weight of about eight parts of oil, one part of soda, and two hundred and fifty parts of loam, heating the mixture to from about 180° to about 212° Fahrenheit, and agitating the same until complete concretion results.

5. As an improved article of manufacture, an artificial fuel consisting of hydrocarbon oil and caustic soda chemically combined and mechanically mixed with an absorbent material in about the proportions specified.

6. As an improved article of manufacture, an artificial fuel compressed in the form of briquets molded from a compound consisting of hydrocarbon oil and caustic-soda salt chemically combined with each other and mechanically mixed with an absorbent material in about the proportions specified.

In testimony whereof I have signed this specification, in the presence of two subscribing witnesses, this 28th day of September, 1901.

EDWARD J. HOFFMAN.

Witnesses:
D. H. FLETCHER,
CARRIE E. JORDAN.